United States Patent [19]

Collonia

[11] 4,248,321
[45] Feb. 3, 1981

[54] DEVICE FOR REGULATING THE TRAVELING SPEED OF A MOTOR VEHICLE

[75] Inventor: Harald Collonia, Königstein, Fed. Rep. of Germany

[73] Assignee: VDO Adolf Schindling AG, Frankfurt am Main, Fed. Rep. of Germany

[21] Appl. No.: 28,812

[22] Filed: Apr. 10, 1979

[30] Foreign Application Priority Data

Apr. 17, 1978 [DE] Fed. Rep. of Germany ....... 2816613

[51] Int. Cl.³ .............................................. B60K 27/00
[52] U.S. Cl. ...................................... 180/179; 340/62
[58] Field of Search ..................... 180/179, 170, 178; 340/62

[56] References Cited

U.S. PATENT DOCUMENTS

| 4,170,274 | 10/1979 | Collonia | 180/179 |
| 4,171,030 | 10/1979 | Ruhl | 180/179 |

FOREIGN PATENT DOCUMENTS

2614326  10/1976  Fed. Rep. of Germany ........... 180/179

Primary Examiner—John J. Love
Assistant Examiner—Michael Mar
Attorney, Agent, or Firm—Otto John Munz

[57] ABSTRACT

A motor vehicle speed regulating device having a desired speed setting device, an actual speed detecting device, and an acceleration controlling device which operates to regulate the rate of acceleration upon changes made in the adjustment of the set speed device, wherein a delay device is connected in a feedback between a speed correcting device and the acceleration control device.

3 Claims, 1 Drawing Figure

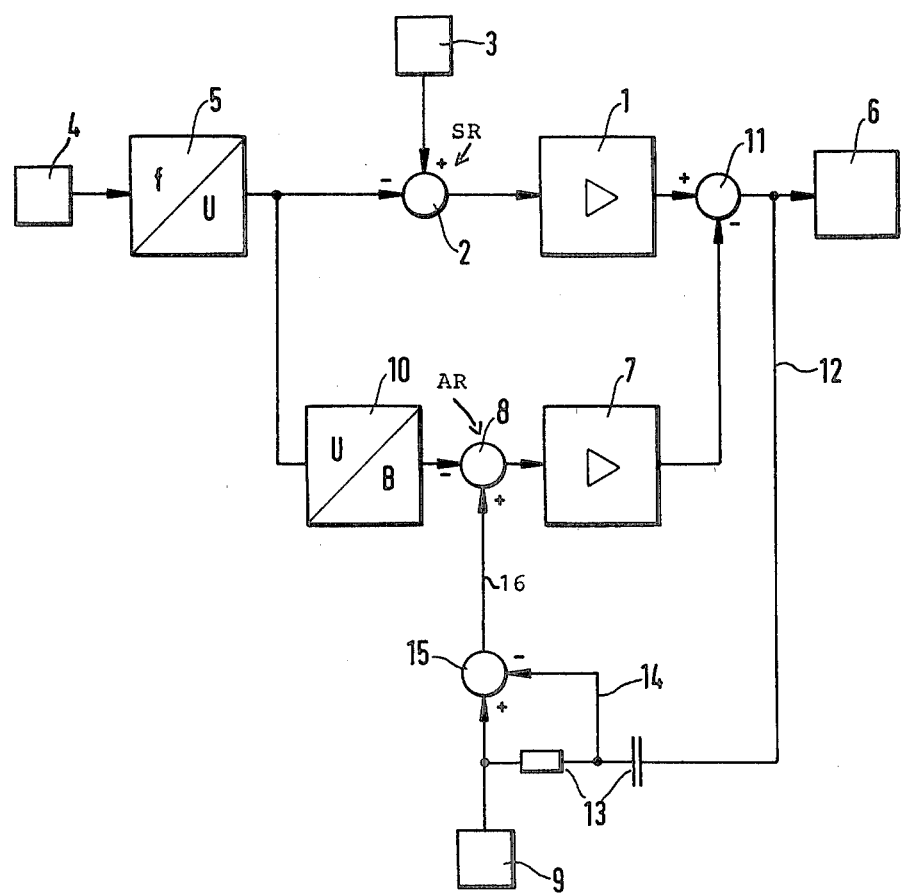

DEVICE FOR REGULATING THE TRAVELING SPEED OF A MOTOR VEHICLE

BACKGROUND OF THE INVENTION

The invention relates to a device for regulating the traveling speed of a motor vehicle by means of an electric speed regulator which compares the prevailing actual speed with a desired rated or selected speed and in the case of a deviation therebetween transmits a signal dependent on the magnitude of the deviation to a correcting element which controls the fuel air mixture supplied to the vehicle engine, by means which produce a delayed change of the signal transmitted to the correcting element upon a change of the rated speed.

Known devices of this kind are designed to effect an automatic regulation of the traveling speed when the automatic operation is switched on, so that upon the occurrence of variables, such as load variations caused, for example, by variations in the grade or inclination of the street or road variations in the traveling speed will not occur. However, it is desirable that at the switching of the device from the normal operation of the motor vehicle to automatic regulation of the traveling speed, if possible no decrease in the speed during the transition from the driver-regulated to the automatically regulated speed occurs. In this case, the device is to present a very rapid adjustment. On the other hand, however, abrupt changes in the traveling speed are to be avoided when during the automatic regulation of the traveling speed, the rated or set speed is modified, since without means for producing a delayed change of the signal transmitted to the correcting element upon a modification or increase of the set speed, the correcting element is first brought into the full-throttle position and only thereafter returned to the position required for maintaining the rated speed.

In order to avoid the unsatisfactory mode of operation last described and to permit a smooth transition when the set speed is modified, while upon the occurrence of load variations only small deviations occur, it has been proposed that, as means for producing a delayed change of the signal transmitted to the correcting element upon a modification, of the set speed, a stage be provided between the regulator and the correcting element which transmits each signal change up to a prespecified amplitude value without delay, and above this amplitude value, transmits the signal with delay to the correcting element or a control stage that controls the correcting element. Thereby, the signal acting upon the control stage is transformed in such a way that at each deviation the control stage starts removing the deviation at great adjustment speed and, after a first partial elimination, terminates the regulating process with a smaller adjustment speed. Thereby, a yerk-free regulation at modifications in the rated speed is achieved. The operation of this known device, however, is still imperfect, since the prespecified amplitude value of the delay means to accomplish a signal modification must be determined as a compromise for all occurring states of operation. Therefore, the device cannot neutralize the speed changes for all possible load variations as quickly as possible.

SUMMARY OF THE INVENTION

The present invention therefore has for an object the construction of a device of the type described initially, which avoids the disadvantages of the device discussed immediately above, in such a way that at all possible load variations the traveling speed is regulated as quickly as possible; but which, however, transmits set speed modifications to the correcting element with delay, and that when the driver controlled speed is switched to the automatically regulated traveling speed, very little or no decrease in the speed occurs.

This object is accomplished according to the invention by provisions of a device with an acceleration regulator which transmits to the correcting element an acceleration value depending on the actual speed and an acceleration rated or set value, wherein a high pass filter is provided as means for the delayed change of the signal transferred to the correcting element, the input of the high pass filter being connected to the correcting element and the output being connected to the acceleration regulator, in such a way that at a signal that increases the fuel air mixture supplied to the engine the acceleration set value at the correcting element is reduced.

By causing the high pass filter to be acted upon by a signal proportional to the position of the correcting element, the result is achieved that a modification in the position of the correcting element due to a modification of the set speed, acts upon the acceleration regulator in such a manner that an opening of the throttle valve brings about a reduction of the acceleration set value. This results in a smooth engagament of the regulator starting from acceleration zero, with the regulator, however, remaining adapted to the power requirement of the vehicle under all conditions of operation. The expense for this device is very small since the starting point is a device with a speed regulator and an acceleration regulator, so that the device is essentially to be supplemented by the high pass filter only. The high pass filter in a feedback from the correcting element to the acceleration regulator therefore brings about, in connection with the acceleration regulator, the delayed actuation of the correcting element. In this operation, the high pass filter makes the signal transmitted in a stationary state to the acceleration regulator disappear, so that the acceleration set value is not permanently affected.

In detail, the device is suitably provided with an acceleration amplifier as a component of the acceleration regulator in such a way that the output of the high pass filter is connected to a subtraction station which as acted upon by the acceleration set value and whose output is connected to the input of the acceleration amplifier. The signal formed by the high pass filter acts thus in an amplified manner upon the signal which acts upon the correcting element, so that the high pass filter can be constructed in an inexpensive way. For this purpose, the device is suitably constructed in such a way that in its simplest form, the high pass filter comprises a resistor-condenser combination.

BRIEF DESCRIPTION OF THE DRAWINGS

The single FIGURE is a diagrammatic block diagram of the device.

DETAILED DESCRIPTION OF THE PREFERRED EMBODIMENTS

In the drawing, a speed amplifier indicated at 1, in connection with a subtraction station 2, (which may be a component of the speed amplifier) consitutes a speed regulator SR. An input of the subtraction station is acted upon by a signal proportional to the rated or set speed and transmitted by a set speed transmitter 3. A second input of the subtraction station is acted upon by an electric signal proportional to the actual speed, which signal may be formed by a speed transmitter 4 via a speed transformer 5 which may be constructed as a frequency voltage converter. The output of regulator SR may be connected via a control stage, not shown, to a correcting element 6 which is constructed as a throttle valve.

The device for regulating the traveling speed further comprises an acceleration regulator AR which comprises an acceleration amplifier 7 with a subtraction station 8 connected in series with the acceleration amplifier 7 at the input side thereof. One input of the subtraction station 8 is acted upon by the signal transmitted by the acceleration set value transmitter 9. The second input of the subtraction station 8 is connected via an acceleration transformer 10 to the output of the speed transformer 5. Acceleration transformer 10 converts the signal transmitted by speed transformer 5 to a signal proportional to the speed change.

The output of the acceleration regulator AR is connected with the input of the correcting element via a subtraction station 11 connected between the output of the speed regulator and the input of the correcting element.

For the purpose of achieving the desired dynamic behavior of the device, especially upon modifications of the rated or set speed, a connection 12 is made from the input of the correcting element to a resistor-condenser combination 13 which is connected as a high pass filter. From the output of the high pass filter, a line 14 leads to a subtraction station 15 which is inserted in a line section 16 between the acceleration set value transmitter and the subtraction station 8 at the input of acceleration amplifier 7, namely in such a way that the value transmitted by the high pass filter is deducted from the acceleration set value.

This device operates in such a way that deviations of the actual speed from the set speed are controlled by the speed regulator, in which operation the acceleration regulator effects an improvement in the dynamic behavior in such a way that the desired set speed is more rapidly achieved in actual speed changes.

In order that modifications of the set speed are accomplished at a low rate or speed of adjustment, the signal conducted to the high pass filter 13, which signal is proportional to the position of the correcting element, acts also upon the acceleration regulator. This takes place in such a manner that in an adjustment of the correcting member which corresponds to an opening of the throttle valve, a signal is deducted from the acceleration selected value at the subtraction station 15, so that the resulting acceleration selected value which reaches subtraction station 8, gradually grows from zero and effects smooth interference of the resulting signal transmitted by the regulators, which acts upon the correcting element. The influence of the high pass filter decreases as the difference between the set speed value and actual speed value decreases, so that the acceleration selected value transmitted by the acceleration selected value transmitter is not affected in the stationary state. The device effects in this operation a good adjustment of the regulation to the power requirement of the vehicle.

What is claimed is:

1. A device for regulating the traveling speed of a motor vehicle by means of an electric speed regulator which compares the prevailing actual speed with a desired set speed and in the case of a deviation transmits a signal depending on the value of the deviation to a correcting element which controls the fuel air mixture supplied to the vehicle engine, including means which produce, upon a modification of the set speed, a delayed modification of the signal transmitted to the correcting element, wherein an acceleration regulator transmits to the correcting element an acceleration value depending on the actual speed change and an acceleration set value, and a delay means for the delayed modification of the signal transmitted to the correcting element is connected with acceleration regulator, said delay means including a high pass filter whose input in connected to the correcting element and whose output is connected to the acceleration regulator in such a way that at the occurrence of a signal that increases the fuel air mixture, the acceleration set value at the correcting element is reduced.

2. A device as claimed in claim 1, wherein the acceleration regulator includes an acceleration amplifier, and wherein the output of the high pass filter is connected to a subtraction element which is acted upon by an acceleration set value and whose output is connected to the input of the acceleration amplifier.

3. A device as claimed in claim 2, wherein the high pass filter comprises a resistor-condenser combination.

* * * * *